Patented May 5, 1942

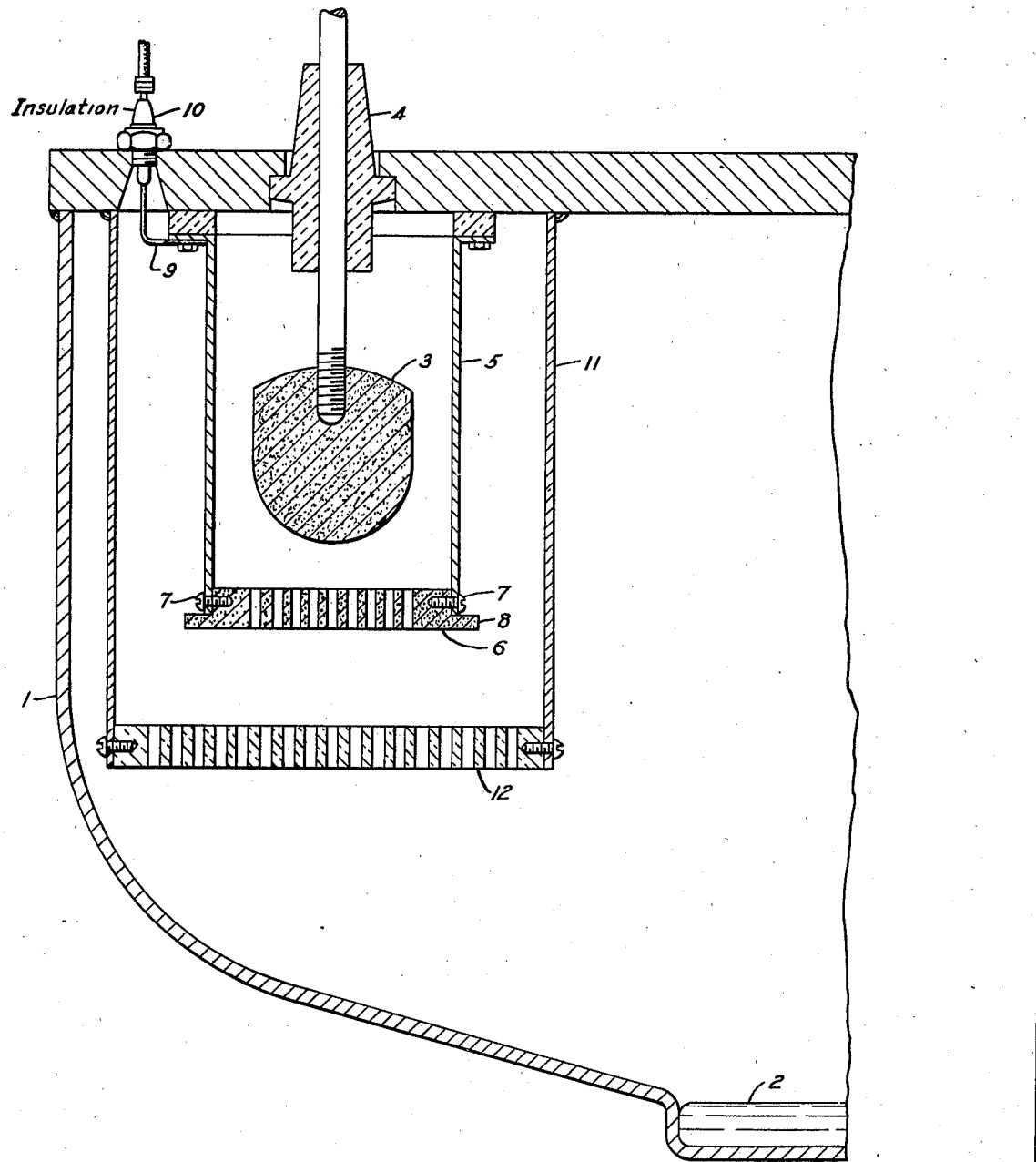

2,282,229

UNITED STATES PATENT OFFICE 2,282,229

SHIELDING OF GRID SUPPORTS

Robert R. Longwell, Pittsburgh, Pa., assignor to Westinghouse Electric & Manufacturing Company, East Pittsburgh, Pa., a corporation of Pennsylvania Application July 26, 1940, Serial No. 347,727

1 Claim. (Cl. 250—27.5)

My invention relates to a vapor electric device and particularly to a shield construction for the anodes of such a device.

In the operation of vapor electric converters, difficulty has been experienced because of the burning away of the control sleeve or control support adjacent the control electrode. I have found that this can be prevented by providing the control electrode with a suitable shield extending over the end of the grid support in such manner that the arc is prevented from coming into contact or passing adjacent to the grid support.

It is accordingly an object of my invention to provide a protecting member for the grid support of a vapor electric device.

It is a further object of my invention to provide a control grid having extending portions for shielding the grid support.

Other objects and advantages of my invention will be apparent from the following detailed description taken in conjunction with the accompanying drawing in which the figure is a fragmentary section elevation through a vapor electric device showing an improved control grid and support according to my invention.

According to the illustrated embodiment of my invention the vapor electric device comprises a suitable container 1 preferably of metal having a plurality of electrodes, one of which is a mercury cathode 2 and cooperating anodes 3 (only one of which is illustrated), the anode 3 being insulated from the container 1 by a suitable insulating bushing 4. Immediately surrounding the anode 3 is a suitable grid support preferably in the form of a tubular shield 5 secured in insulating relation to the container 1. The open end of the support 5 receives a suitable deionizing grid 6 preferably made of graphite and secured in any suitable manner as by screws 7 to the grid support 5.

In order to prevent burning of the grid support 5 the grid 6 is extended beyond the end of the support 5 and provided with an overhanging lip 8 or extension which protects the grid support 5 so that it does not come in contact with or in proximity with the arc flowing to the anode 3.

Control potential is applied to the controlled grid 6 by means of a suitable connection 9 passing through the container wall by a suitable insulating bushing 10.

Preferably the control grid 6 and its associated support 5 is enclosed by a suitable arc guide 11 which may be connected to the container 1 in any suitable manner and having a deionizing grid 12 preferably of insulating material such as quartz closing the open end thereof.

While for purposes of illustration I have shown and described a specific embodiment of my invention, it will be apparent that changes and modifications can be made therein without departing from the true spirit of my invention or the scope of the appended claim.

I claim as my invention:

In a vapor-electric device having an anode and a cathode in an evacuated container, an anode protective device comprising a substantially tubular metallic shield about the anode, a graphite grid secured in said shield in spaced relation to the anode, a portion of said grid extending beyond the end of the support, a laterally extending lip on said grid, said lip covering the end of the shield and extending laterally beyond the shield.

ROBERT R. LONGWELL.